(12) United States Patent
Guner et al.

(10) Patent No.: US 11,914,097 B2
(45) Date of Patent: Feb. 27, 2024

(54) METHOD FOR COMBINED RESISTIVITY AND PERMITIVITY DETERMINATION WITH BOREHOLE IMAGERS

(71) Applicant: Halliburton Energy Services, Inc., Houston, TX (US)

(72) Inventors: Baris Guner, Houston, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 818 days.

(21) Appl. No.: 16/465,548

(22) PCT Filed: Mar. 29, 2018

(86) PCT No.: PCT/US2018/025203
§ 371 (c)(1),
(2) Date: May 30, 2019

(87) PCT Pub. No.: WO2019/190532
PCT Pub. Date: Oct. 3, 2019

(65) Prior Publication Data
US 2021/0055449 A1    Feb. 25, 2021

(51) Int. Cl.
*G01V 3/18* (2006.01)
*E21B 47/002* (2012.01)
(Continued)

(52) U.S. Cl.
CPC ............ *G01V 3/38* (2013.01); *E21B 47/0025* (2020.05); *E21B 49/00* (2013.01); *G01V 3/34* (2013.01)

(58) Field of Classification Search
CPC ........ G01V 3/38; G01V 3/34; E21B 47/0025; E21B 49/00
See application file for complete search history.

(56) References Cited

U.S. PATENT DOCUMENTS 3,060,373 A    10/1962    Doll
3,132,298 A     5/1964    Doll et al.
(Continued)

FOREIGN PATENT DOCUMENTS

CA         685727       5/1964
WO     2019177588       9/2019

OTHER PUBLICATIONS

ISRWO International Search Report and Written Opinion for PCT/US2018/025203 dated Jan. 25, 2019.
(Continued)

*Primary Examiner* — Mohamed Charioui
*Assistant Examiner* — Christine Y Liao
(74) *Attorney, Agent, or Firm* — John Wustenberg; C. Tumey Law Group PLLC (57) ABSTRACT

A method and system for resistivity imaging may comprise disposing a downhole tool into a borehole, wherein the downhole tool comprises a pad and a plurality of electrodes disposed on the pad, taking an impedance measurement with the plurality of electrodes, applying a correction to the measured impedance by using a relaxation constant of the measured impedance to find a corrected impedance for each electrode of the plurality of electrodes, and constructing an image from the corrected impedance, wherein the image maps formation impedance. The system for resistivity imaging may comprise a downhole tool, a conveyance for disposing the downhole tool in a borehole, and an information handling system. The downhole tool may further comprise an arm and a pad wherein the pad comprises a plurality of electrodes and at least one return electrode.

20 Claims, 8 Drawing Sheets

(51) Int. Cl.
*E21B 49/00* (2006.01)
*G01V 3/34* (2006.01)
*G01V 3/38* (2006.01)

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 6,191,588 | B1 | 2/2001 | Chen |
| 7,397,259 | B1 | 7/2008 | Agarwal et al. |
| RE42,493 | E | 6/2011 | Tabarovsky et al. |
| 8,579,037 | B2 | 11/2013 | Jacob |
| 8,901,933 | B2 | 12/2014 | Hayman |
| 2010/0039115 | A1* | 2/2010 | Bespalov .............. G01V 3/20 324/355 |
| 2011/0114309 | A1 | 5/2011 | Bloemenkamp et al. |
| 2014/0347056 | A1 | 11/2014 | Hayman et al. |
| 2015/0008927 | A1* | 1/2015 | Cheung .............. G01V 3/20 324/339 |
| 2015/0185354 | A1* | 7/2015 | Hayman .............. E21B 47/085 324/355 |
| 2015/0260874 | A1 | 9/2015 | Chen et al. |
| 2015/0355372 | A1 | 12/2015 | Bloemenkamp et al. |
| 2017/0075022 | A1 | 3/2017 | Cheung et al. |

OTHER PUBLICATIONS

Bloemenkamp et al, Design and Field Testing of a New High-Definition Microresistivity Imaging Tool Engineered for Oil Based Mud, SPWLA Annual Logging Symposium, May 2014.

Chen et al, Inversion-Based Workflow for Quantitative Interpretation of the New-Generation Oil-Based Mud Resistivity Imager, SPWLA Annual Logging Symposium, May 2014.

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.

Chen, et al. A Novel Array Laterolog Method, Oct. 1998.

SPWLA 38th Annual Logging Symposium, Vigne, et al., Strange Invasion Profiles: What Multiarray Induction Logs can tell us about how Oil-Based Mud affects the invasion process and wellbore stability, Jun. 1997.

SPE22726, Safinya, et al., Improved Formation Imaging with Extended Microelectrical Arrays, 1991.

SPE30584, Smits, et al., High Resolution from a New Laterolog with Azimuthal Imaging, 1995.

SPE Formation Evaluation, Davies, et al., Azimuthal Resistivity Imaging: A New-Generation Laterolog, Sep. 1994.

SPE401, Suau, et al., The Dual Laterolog-R Tool, Jul. 1973.

* cited by examiner

# METHOD FOR COMBINED RESISTIVITY AND PERMITIVITY DETERMINATION WITH BOREHOLE IMAGERS

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. In essence, their function is the electrical equivalent of the formation coring, with much higher borehole coverage. Borehole imager tools may be used to determine formation stratigraphy, dips of the formation layers as well as, borehole and formation stress. Borehole imager tools may be particularly important in learning about thin beds and fracture locations. Oil based muds may provide higher performance than the water based muds and may be preferable in deep water environments where high temperature and pressure cause loss of water and in shale zones where water may cause swelling. However, oil based mud may be highly resistive. At low frequencies, this resistance may reduce the sensitivity of the borehole imager tools to the outside formation.

To overcome this effect, the tools may operate at high frequencies. At these high frequencies, pads on the borehole imager tools may become capacitively coupled to the formation, reducing the effect of the oil based mud. Additionally, when formation resistivity is high, oil based mud imagers may exhibit a dielectric roll-off effect that may cause the measured impedance to decrease as the formation resistivity increases. This effect may be more pronounced at higher operating frequencies, which may skew measurements from the borehole imager tool.

BRIEF DESCRIPTION OF THE DRAWINGS

For a detailed description of the preferred examples of the invention, reference will now be made to the accompanying drawings in which.

DETAILED DESCRIPTION

The present disclosure relates generally to a system and method for correcting for a dielectric effect and obtaining an accurate resistivity estimate from a downhole device. More particularly, determining an accurate resistivity estimate may be further used to obtain an estimate of the formation permittivity as well. Discussed below, a dielectric correction may be made to correct for the dielectric rolloff using techniques that may utilize a formation relaxation constant. If mud properties and standoff are known (or are measured), the method may be extended to include a subtraction of mud impedance from the measured impedance to improve the accuracy of the resistivity estimate. The calculated resistivity estimate may be used along with an impedance measurement to obtain an estimate of a dielectric constant of a formation. Proposed systems and methods may increase accuracy of the resistivity images as well as producing permittivity images in real time without the need for an inversion. Permittivity images generally are processed with computationally costly inversion. Additionally, systems and methods may act as an initial guess point to improve the results of an inversion algorithm.

Figure 1:
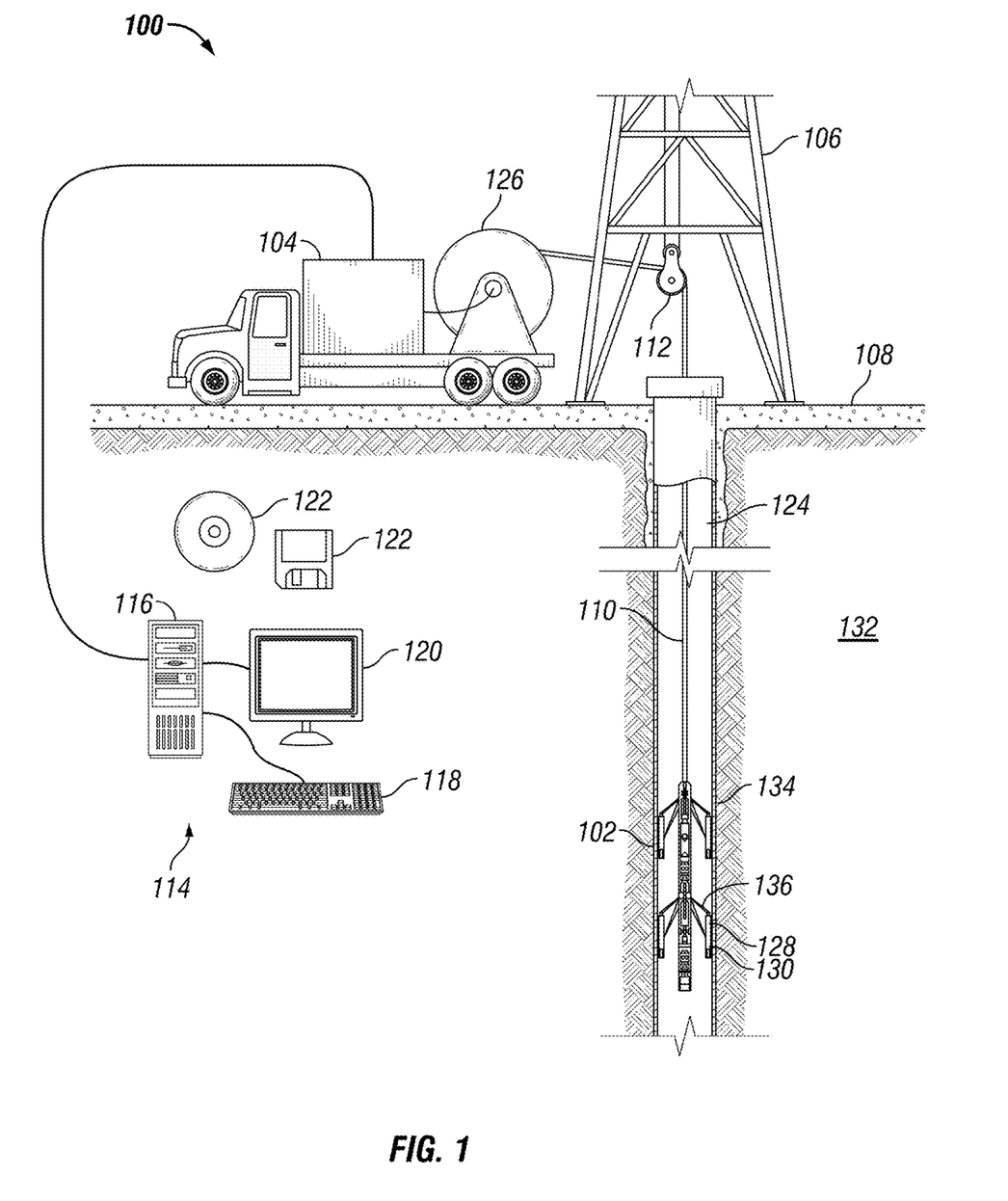
FIG. 1 illustrate an example of a well measurement system.

FIG. 1 illustrates a cross-sectional view of a well measurement system 100. As illustrated, well measurement system 100 may comprise downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel minor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110.

Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any faun of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high resolution resistivity image of formation 132 immediately surrounding borehole 124. This high resolution resistivity image may depict boundaries of subsurface structures, such as a plurality of layers disposed in formation 132. These images may be used in reservoir characterization. Images with high resolution may allow accurate identification of thin beds and other fine features such as fractures, clasts and vugs. These images may provide information about the sedimentology, lithology, porosity and permeability of formation 132. The images may complement, or in some cases replace, the process of coring.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a plurality of electrodes, such as button array 128. Downhole tool 102 may also comprise a return electrode 130. It should be noted that the plurality of electrodes of button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may comprise both button array 128 and return electrodes 130. Pads 134 may be attached to at least one arm 136 that may extend from downhole tool 102. Arm 136 may extend pad 134 away from downhole tool 102. In examples, arm 136 may place pad 134 in contact with borehole 124. It should be noted that there may be a plurality of arms 136. One or more arms 136 may place an arrangement of button arrays 128 and/or return electrode 130 in close proximity to the wall of borehole 124.

During operations, an operator may energize an individual electrode, or any number of electrodes, of button array 128. A voltage may be applied between the electrode and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 124. Therefore, current emitted by each electrode may be measured and recorded in order to obtain an image of the resistivity of formation 132.

To produce a resistivity image of formation 132, a current may be transmitted from at least one electrode of button array 128 and return to return electrode 130. These two electrodes may be referred to as the current electrodes. Then, the voltage drop across the electrode of button array 128 may be measured and used to estimate the impedance of formation 132. In these alternative implementations, electrodes may be referred to as voltage electrodes or monitor electrodes. Proposed method may operate in any of the two designs above or any other similar oil based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from b downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
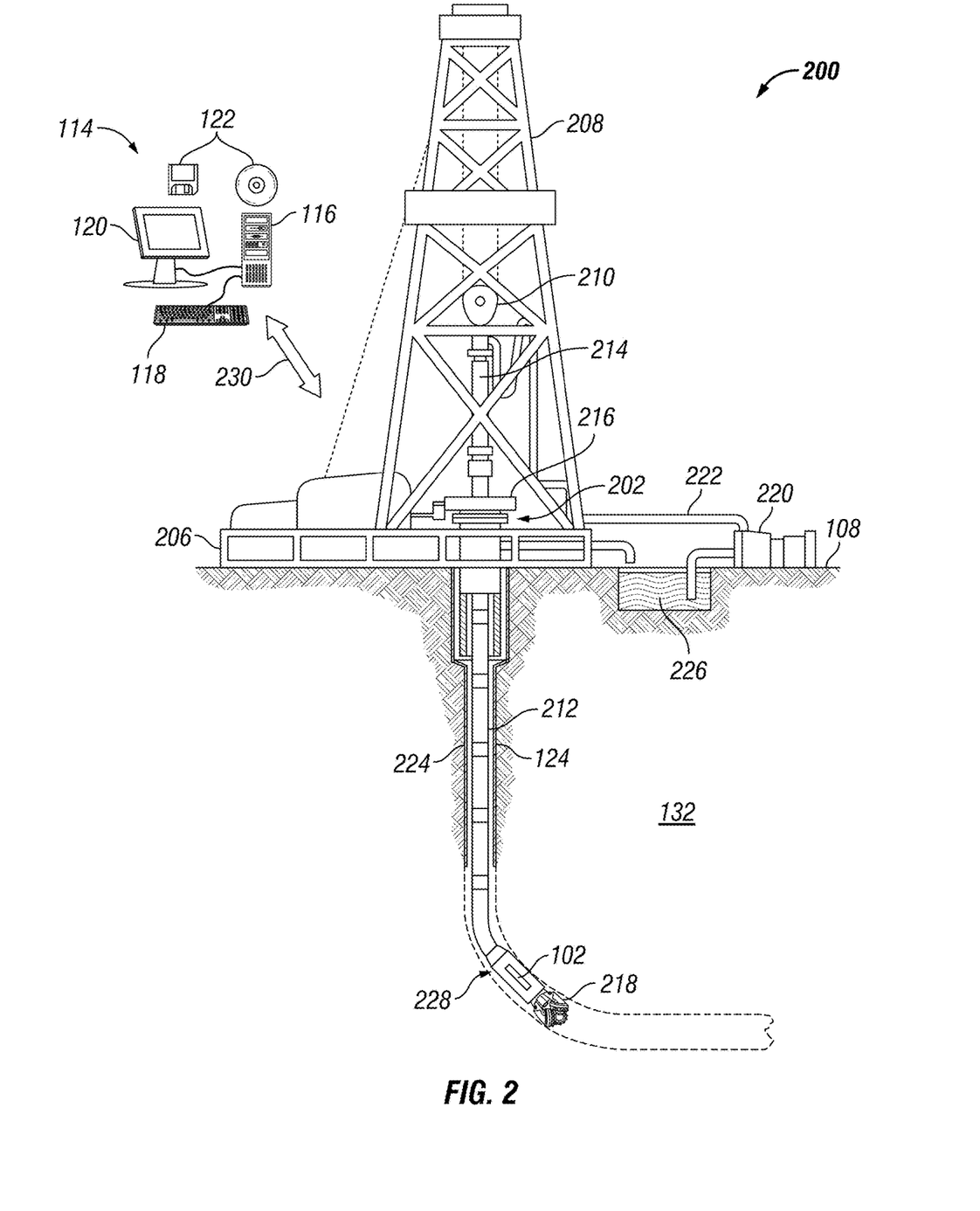
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into formation 132 from surface 108 (Referring to FIG. 1). Generally, borehole 124 may include horizontal, vertical, slanted, curved, and other types of borehole geometries and orientations. Imaging tools may be used in uncased sections of the borehole. Measurements may be made by imaging tools in cased sections for purposes such as calibration.

As illustrated, borehole 124 may extend through formation 132. As illustrated in FIG. 2, borehole 124 may extend generally vertically into the formation 132, however borehole 124 may extend at an angle through formation 132, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further comprise downhole tool 102 (Referring to FIG. 1). Downhole tool 102 may be disposed on the outside and/or within bottom hole assembly 228. Downhole tool 102 may comprise test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114 (Referring to FIG. 1), which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 3:
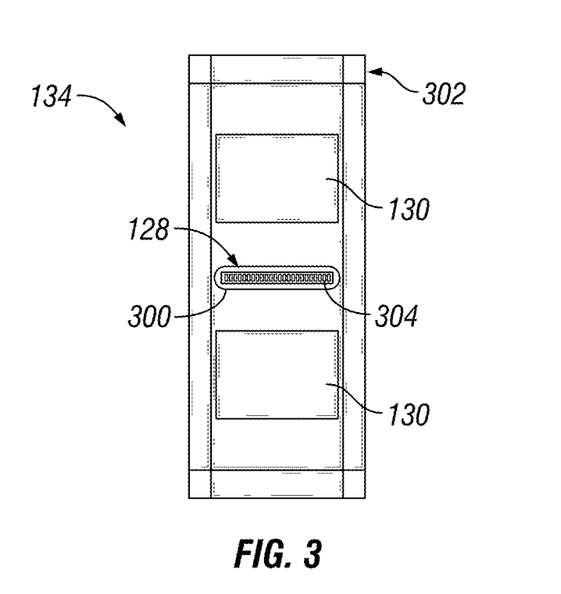
FIG. 3 illustrates an example of a pad.

FIG. 3 illustrates an example of pad 134. Pad 134 may serve to place button array 128 and/or return electrode 130 in contact with or in close proximity to borehole 124. Pad 134 may comprise a button array 128, a return electrode 130, a guard 300, and a housing 302. In examples, there may be a plurality of button arrays 128. Button array 128 may comprise a button electrode 304, wherein button electrode 304 may be a sensor that senses impedance of formation 132. There may be any suitable number of button electrodes 304 within button array 128 that may produce a desired, predetermined current. Without limitation, the range for a suitable number of button electrodes 304 within button array 128 may be from about one button electrode 304 to about one hundred button electrodes 304. For example, the range for a suitable number of button electrodes 304 within button array 128 may be from about one button electrode 304 to about twenty-five button electrodes 304, from about twenty-five button electrodes 304 to about fifty button electrodes 304, from about fifty button electrodes 304 to about seventy-five button electrodes 304, or from about seventy-five button electrodes 304 to about one hundred button electrodes 304.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each button electrode 304 and return electrode 130. The level of the voltage may be controlled by information handling system 114. This may cause currents to be transmitted through button array 128. These currents may travel through the mud and formation 132 and may reach back to return electrode 130. The amount of current emitted by each button electrode 304 may be inversely proportional to the impedance seen by that button electrode 304. This impedance may be affected by the properties of formation 132 and the mud directly in front of each button electrode 304. Therefore, current emitted by each button electrode 304 may be measured and recorded in order to obtain an image of the resistivity of formation 132.

In examples, a current may be transmitted from button electrode 304 and return to return electrode 130. These two electrodes may be referred to as the current electrodes. Then, the voltage drop across button array 128 may be measured and used to estimate the impedance of formation 132. In these alternative implementations, button electrodes 304 may be referred to as voltage electrodes or monitor electrodes. Proposed method may operate in any of the two designs above or any other similar oil based mud resistivity imager tool without any limitations. In the rest of the text, the imager tool will be assumed to be of the first design without any loss of generality.

Guard 300 may help to focus most of the current produced by button array 128 into formation 132 radially. Guard 300 may be disposed around button array 128. Guard 300 may include the same potential as button array 128.

In examples, housing 302 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 302 may be a metal plate. Housing 302 may be connected through arm 136 to downhole tool 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between a button electrode 304 and formation 132 for each button electrode 304. The voltage between button array 128 and return electrodes 130 may be measured and divided by the transmitted current to produce a value for the impedance seen by each button electrode 304. Most of the transmitted current may be returned to return electrodes 130 although some portions of it may return through housing 302 and downhole tool 102 (referring to FIG. 1).

Figure 4:
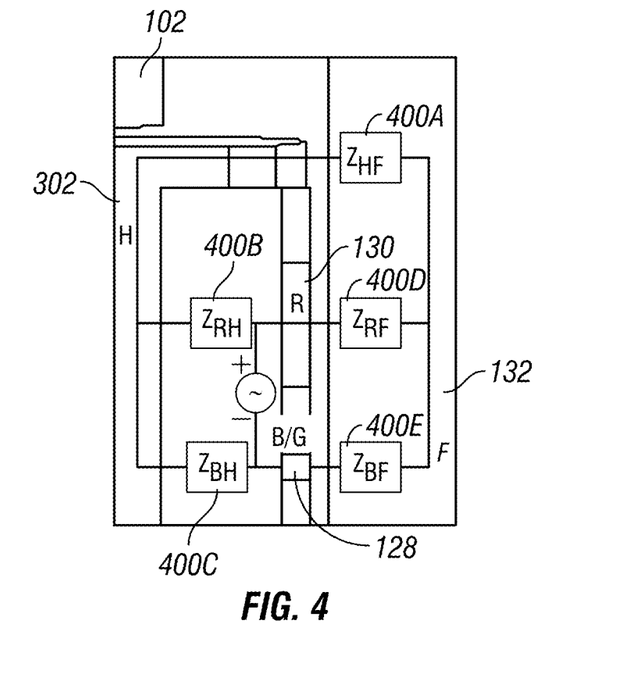
FIG. 4 illustrates an example of a circuit model of a downhole tool.

FIG. 4 illustrates an example of a circuit model that may approximate the downhole tool 102. Effects of the transmitted current may be approximately characterized by a housing-to-formation impedance value 400A, a return electrode-to-housing impedance value 400B, a return electrode-to-formation impedance value 400C, a button-to-housing impedance value 400D, and a button-to-formation impedance value 400E. Impedance may be calculated below, wherein Z is the impedance, $V_{BR}$ is the button to return electrode voltage and $I_B$ is the button current:

$$Z = \frac{V_{BR}}{I_B} \tag{1}$$

The value calculated in Equation (1) may be equal to $Z_{BF}+Z_{RF}$, as shown in FIG. 4, wherein $Z_{BF}$ is the impedance from an individual button of button array 128 to formation 132 and $Z_{RF}$ is the impedance of return electrode 130 to formation 132. It should be noted that impedances for each button of button array 128 may differ based on variations in borehole 124 and the environment. These variations in measured impedances, which may be illustrated in an impedance image, may be used to determine geophysical features. Additionally, both $Z_{BF}$ and $Z_{RF}$ have contributions from both the surrounding mud and formation 132 (referring to FIG. 1). Thus, equivalently it may be written in Equation (2) as:

$$Z \approx Z_{BF} = Z_{mud} Z_F \qquad (2)$$

As a result, measured impedance may have contributions from both the mud and formation 132, wherein $Z_{mud}$ is the impedance of the mud and $Z_F$ is the impedance of formation 132. Imaginary parts of $Z_F$ and $Z_{mud}$ may be assumed to be mainly capacitive. Assuming this capacitance may be in parallel with the resistive portion, then $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \qquad (3)$$

wherein $R_M$ is the mud resistance, $R_F$ is the resistance of formation 132, $C_M$ is the mud capacitance, $C_F$ is the capacitance of formation 132, j is the unit imaginary number, and ω is the angular frequency. Both the mud resistance and mud capacitance may increase as standoff increases and may decrease with the increase in effective area of button array 128. "Standoff" may be used to denote the distance of the elements of a pad 134 from a wall of borehole 124 (e.g., Referring to FIG. 1). Standoff of each individual button in a button array may vary; standoffs of the return electrodes may differ from those of the buttons as well. Standoff variations will significantly affect button to formation impedance 400E. In the simplified circuit model, it is assumed that the standoff of each element of the pad is constant. Standoff may assume that pad 134 is movable while downhole tool 102 remains immobile. In examples, to achieve large distances from the wall of borehole 124, downhole tool 102 may be moved along with pad 134. In examples, the term "eccentricity" may be used instead of "standoff". The proposed methods (discussed further below) may be equally valid whether pad 134 moves or both pad 134 and downhole tool 102 move.

Figure 5:
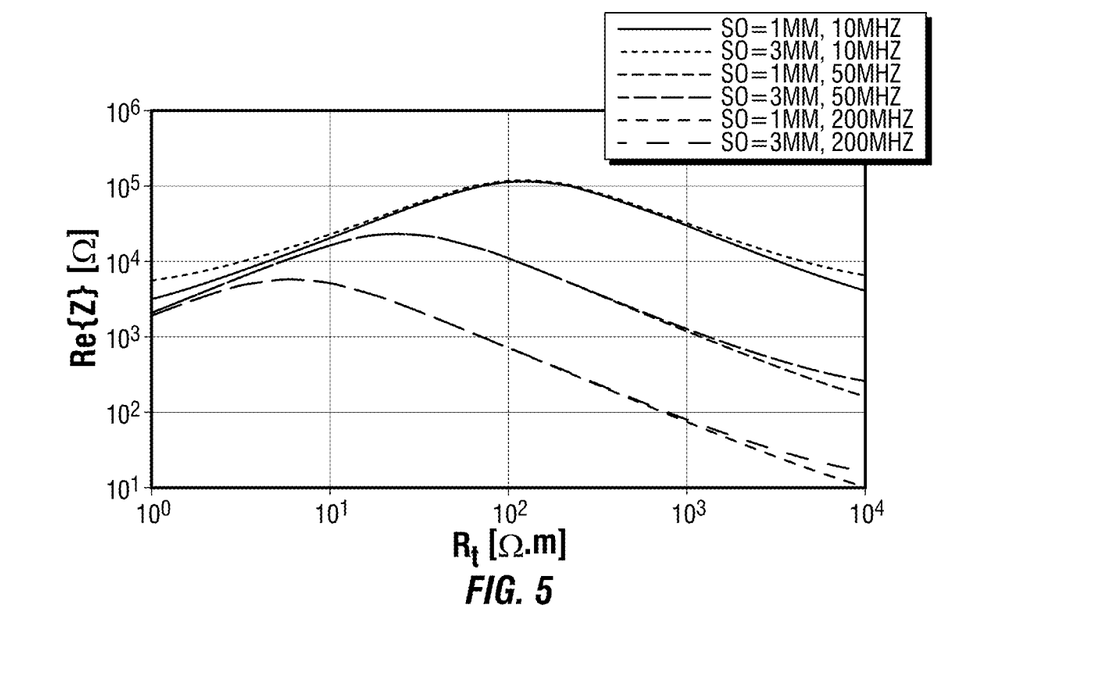
FIG. 5 illustrates a graph of the real part of the measured impedance versus the formation resistivity.

It should be noted that Equation 3 may also be used to obtain basic performance curves for well measurement system 100 (e.g., Referring to FIG. 1) which may be fairly accurate in homogeneous formations in determining the variation of the response of an exemplary button in the button array with changing environmental parameters. FIG. 5 illustrates a real part of the measured impedance versus the formation resistivity (Rt). It should be noted that an imaginary part of the impedance may be primarily determined by mud capacitance, therefore it is not plotted in this disclosure. FIG. 5 illustrates a graph in which a formation permittivity (εF) is 15, mud permittivity (εM) is 6 and mud resistivity (ρM) is 8000 Ω-m. Results for three different frequencies (10 MHz, 50 Mhz and 200 MHz) at 2 different standoffs (1 mm and 3 mm) are shown. Standoff may be defined as a distance of the outer surface of pad 134 to the inner surface of the wall of borehole 124 (e.g., Referring to FIG. 1).

As shown in the graph of FIG. 5, at low frequencies, mud effect, discussed above, may dominate measurements which may result in a reversal in decreasing trend. At high frequencies, a roll-off effect may be observed where impedance peaks and then drops with a negative slope as sufficiently high formation resistivities. In the middle range, with no mud or dielectric effect, a linear relationship between impedance and formation resistivity is observed, identified as:

$$Rf = FZ \qquad (4)$$

Such linear relationship may have advantages. For example, the linear relationship may allow for reduced computation for conversion schemes from measured impedance to formation resistivity, the linear relations may result in an image with more equal distribution of colors and optimum contrast, the linear relationship may allow an image, such as FIG. 5, to be sensitive in all formation resistivity ranges. Additionally, multiple frequencies may allow an operator to extend the linear range to lower/higher resistivities as is illustrated in FIG. 5 (notice the common linear for all frequencies between Rt=1 and Rt=50 Ohmm). However, beyond the formation resistivity of 50 Ohmm, even the lowest frequency exhibits non-linear behavior. This may potentially be alleviated by introducing any number of frequencies. However, practical design considerations in a well measurement system 100 may limit the number of frequencies that may be transmitted. Furthermore, frequencies above 200 MHz may be difficult to work with due to downhole electrical components abilities. As a result, an operator may use other schemes in view of a linear relationship.

Figure 6:
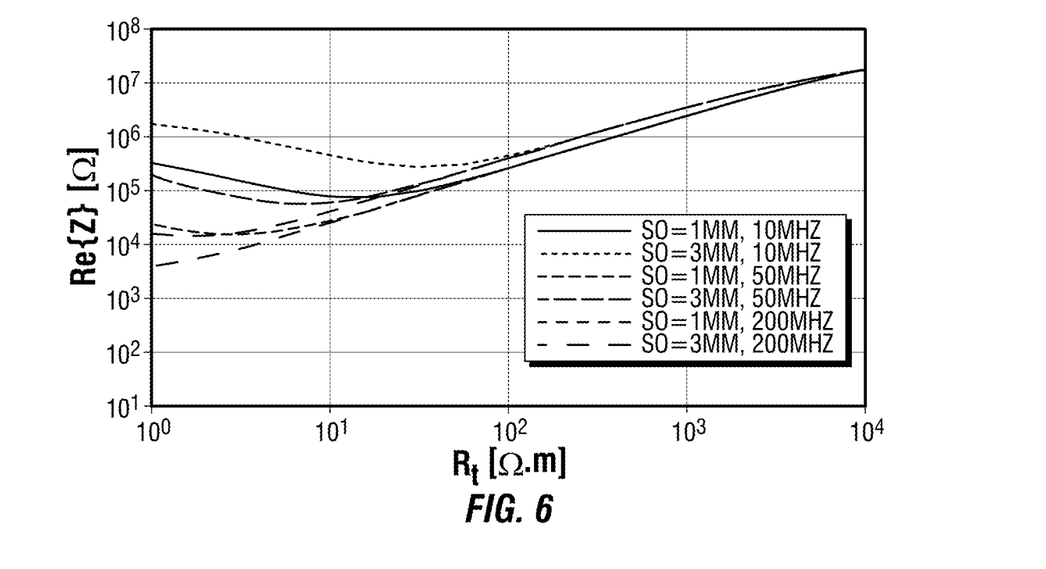
FIG. 6 illustrates a graph of the real part of the measured impedance versus the formation resistivity after processing for a dielectric correction.

For example, an alternate scheme may utilize a processing scheme. In view of Equation 3, in cases where $Z_m \ll Z_f$, the equation may be altered as seen below:

$$Z_{BF} \approx \frac{R_F}{1 + j\omega R_F C_F} \qquad (5)$$

$$\phi_z \approx \tan^{-1}(-\omega R_F C_F) \qquad (6)$$

$$\omega R_F C_F \approx -\tan(\phi_z) \qquad (7)$$

$$Z_{BF} \approx \frac{R_F}{1 - j\tan(\phi_z)} \qquad (8)$$

$$Z_{corr} = Z_{BF}(1 - j\tan(\phi_z)) \qquad (9)$$

where $Z_{corr}$ is defined as an impedance corrected for a dielectric effect. It should be noted that Equation 7 includes a multiplication of formation resistance and capacitance. Thus, the tangent of the phase angle of the measured impedance may be defined as the formation relaxation constant in analogy with the circuit systems. Equation 9 represents a proposed method to apply the dielectric correction on recorded data from well measurement system 100. In FIG. 6, results when dielectric correction may be applied to recorded measurements from well measurement system 100 depicted in FIG. 5 are shown. It may be seen that the dielectric rolloff effect from FIG. 5 may be eliminated at high formation resistivities using this processing scheme. However, if mud resistivity is prevalent in measurements from well measurement system 100 that it cannot be ignored, results may deteriorate and becomes saturated. Nonetheless, it may be possible to determine resistivity by dividing this corrected impedance with a tool constant when the formation resistivity is high.

Figure 7:
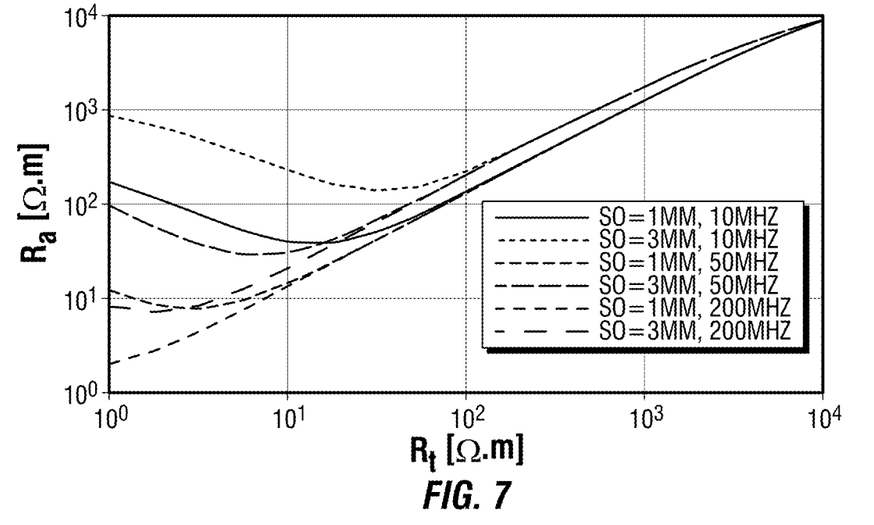
FIG. 7 illustrates a graph of the real part of the measured impedance versus the formation resistivity after processing for the dielectric correction and scaling with a tool constant.

As disclosed above, different methods may be used to remove a dielectric effect to obtain a resistance value that varies linearly with formation resistivity from measurements taken by well measurement system 100 (e.g., Referring to FIG. 1). This measured resistance may be converted into an apparent resistivity by a simple division of a predetermined tool constant. An example of this procedure is shown in FIG. 7. Although the resulting apparent resistivity may be accurate for a large range of formation resistivities, accuracy may be improved even further by determining a mud impedance approximately and subtracting it from the measured impedance before applying a dielectric correction scheme and applying the division by a tool constant, which is known.

Figure 9:
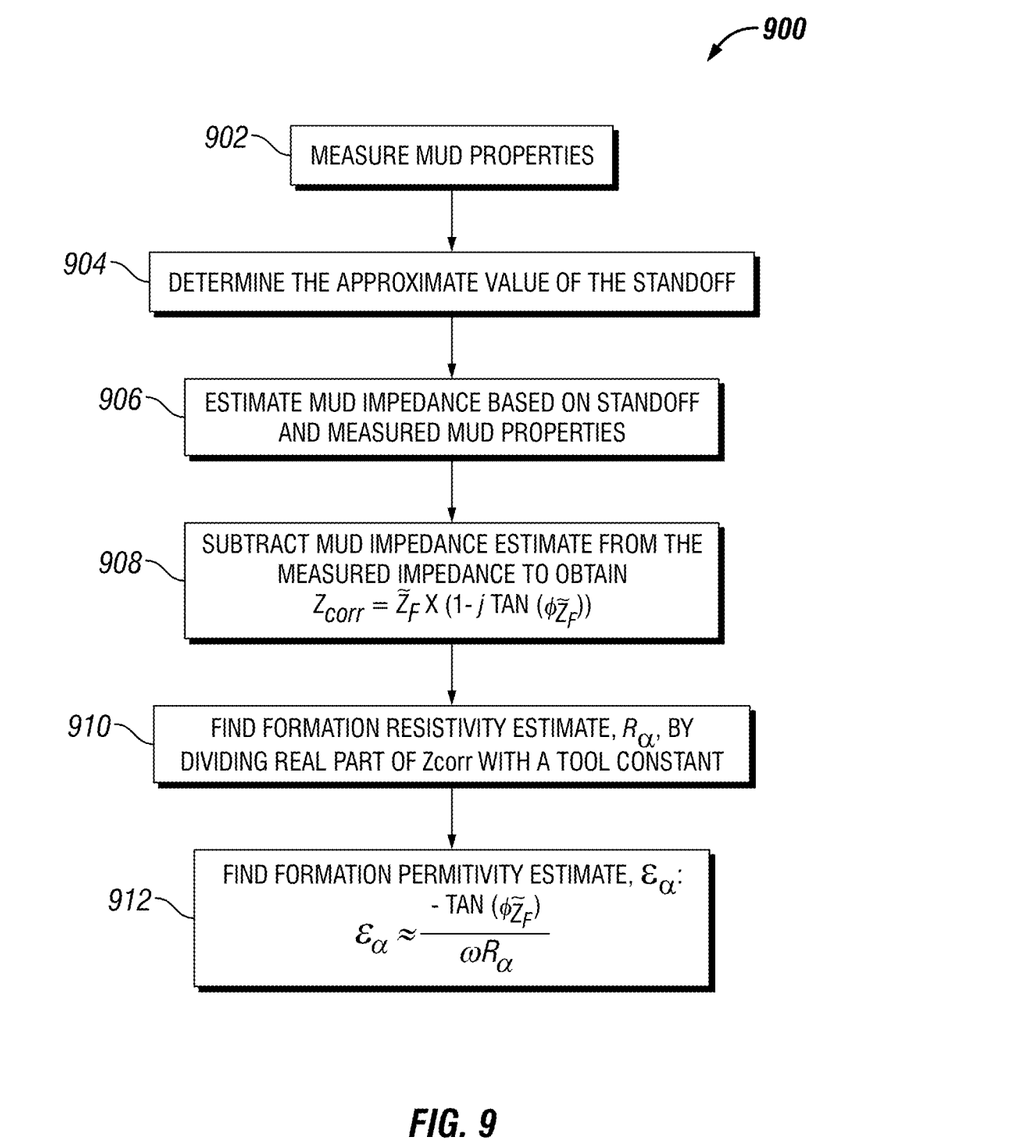
FIG. 9 illustrates a workflow of processing measurements with the dielectric correction and the scaling with the tool constant.

An improved dielectric correction method 900, as illustrated in FIG. 9, may be performed by beginning with step 902, which may include determining mud properties (for example, phase angle of the mud impedance vector) using a reference measurement. This may be performed by a variety of methods, such as using a mud cell, making impedance measurements inside the casing, and/or measuring mud properties using a separate equipment uphole. In step 904, a temperature correction may be applied to the mud properties found in step 902 if the mud properties may be measured at a different temperature. In step 906, a standoff, defined above, for well measurement system 100 may be estimated. For example, a lower frequency impedance measurement (in the range of a 100 kHz) may be made using well measurement system 100 (e.g., Referring to FIG. 1). Measured impedance may provide little contribution from formation 132 (e.g., Referring to FIG. 1) for a large range of formation resistivities, thus the magnitude of the measured impedance may be calibrated to directly give the standoff for each button electrode 304 (e.g., Referring to FIG. 3). Thus, low and high frequency measurements may be taken simultaneously and/or in rapid succession such that the standoff may not vary significantly. It should also be noted that the accuracy of a mud impedance estimate may not significantly affect the accuracy of an algorithm scheme outlined below for step 908.

In step 908, a mud impedance estimated may be subtracted from a measured impedance. Using measured mud properties and standoff distance found in step 906, step 908 may estimate a mud impedance $\tilde{Z}_{mud}$. For example, the equations below may be used to determine a corrected impedance $Z_{corr}$.

$$\tilde{Z}_F = Z_{BF} - \tilde{Z}_{mud} \qquad (10)$$

$$Z_{corr} = \tilde{Z}_F \times \left(1 - j\tan(\phi_{\tilde{Z}_F})\right) \qquad (11)$$

Figure 8:
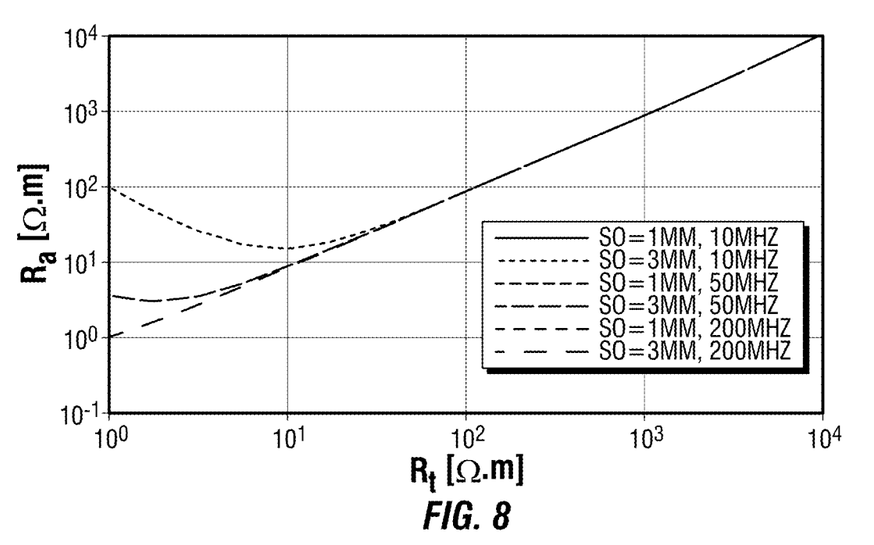
FIG. 8 illustrates a graph of apparent resistivity after processing for the dielectric correction and the scaling with the tool constant.

In Equation 11, $\tan(\phi_{\tilde{Z}_F})$ may be denoted as the relaxation constant for $\tilde{Z}_F$, the mud effect removed impedance. In step 910, a real part of the corrected impedance ($Z_{corr}$) may be scaled (through division) by a tool constant of well measurement system 100 (e.g., Referring to FIG. 1) to a formation resistivity estimate, $R_a$. Apparent resistivity obtained as a result of for the dielectric correction is shown in FIG. 8. To account for the fact that there may be an error in mud impedance estimation, a 0.5 mm error was introduced in standoff measurements. This assumes that the standoff distance was estimated as 1.5 mm for the actual 1 mm standoff and 3.5 mm for the actual 3 mm standoff distance. Thus, accurate resistivity estimates may be obtained as a result of processing scheme described above, especially at higher frequencies. For example, measurements at 200 MHz may produce an accurate resistivity measurement, which may be made in the range of 1 Ω-m to above 10000 Ω-m. Although these results may be obtained using an approximate formulation for the response of button electrode 304 (e.g., Referring to FIG. 3) and noise in measurements may affect the results, it may be concluded from FIG. 8 that the above identified processing scheme may obtain a high accuracy with a relatively large error in standoff distance, such as 0.5 mm.

In step 912, dielectric constant estimate may be made based on the apparent resistivity estimate and Equation 3 to determine a formation permittivity estimate as follows:

$$\omega R_F C_F \approx -\tan(\phi_{\tilde{Z}_F}) \qquad (12)$$

$$\omega \delta_F \varepsilon_F \approx -\tan(\phi_{\tilde{Z}_F}) \qquad (13)$$

$$\varepsilon_a \approx \frac{-\tan(\phi_{\tilde{Z}_F})}{\omega R_a} \qquad (14)$$

Figure 10:
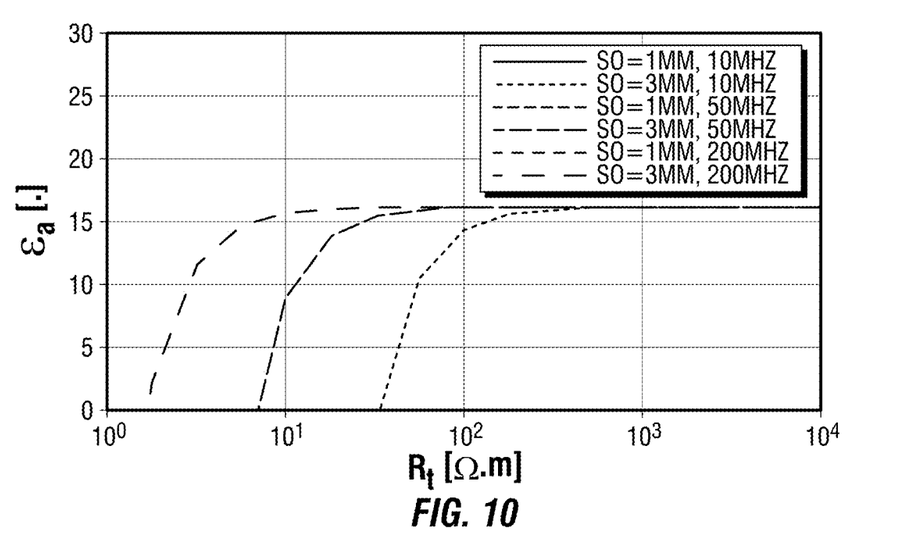
FIG. 10 illustrates a graph of an estimation of a formation dielectric constant after the dielectric correction and the scaling with the tool constant.

In Equation 14, $\sigma F$ denotes the formation resistivity and $\varepsilon_a$ is the formation dielectric constant estimate. In the last step, formation resistivity estimate obtained using Equation 11 is used in place of the true formation resistivity to obtain the formation permittivity estimate. For the case shown in FIG. 8 (when the standoff is assumed to be measured with a 0.5 mm error) and using the apparent resistivities obtained in FIG. 8, a formation permittivity estimate is obtained. Results of this procedure are shown in FIG. 10. As shown by the graph, accurate estimates may be obtained for the formation permittivity for a large range of formation resistivity values. Results may be best at the highest frequency where the mud contribution is the lowest. It should be noted that accuracy of the permittivity estimate may be dependent on the obtained formation resistivity estimate.

Figure 11:
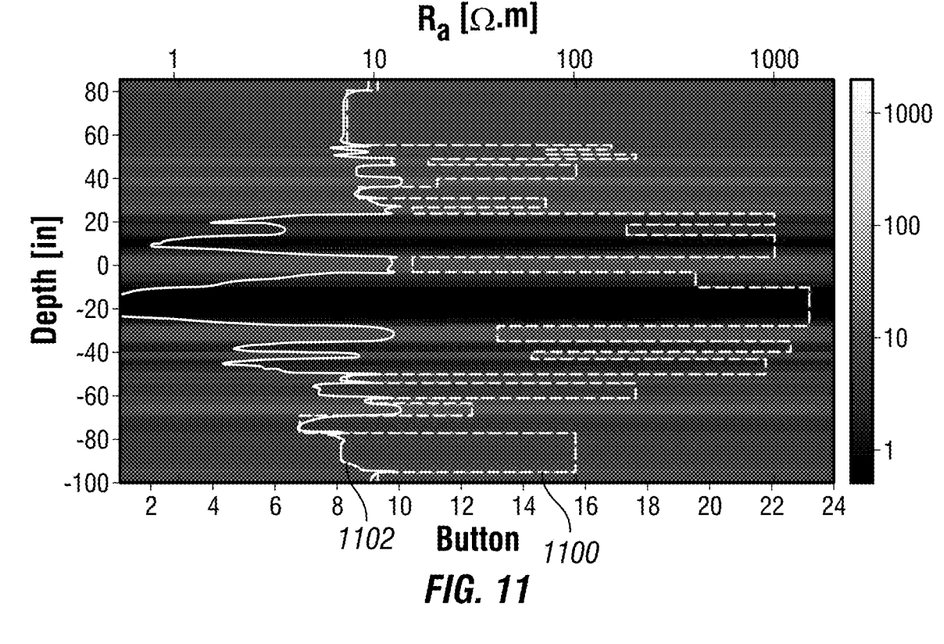
FIG. 11 illustrates an example of measured apparent resistivity without the dielectric correction.

As a further illustration of the algorithm's performance, response of a twenty-four button imager tool operating at 50 MHz simulating an Oklahoma type formation is illustrated in FIG. 11. Dip of the formation is 0°. Mud resistivity is 8000 Ω-m, mud dielectric constant is 6 and formation dielectric constant is 15. FIG. 11 shows the apparent resistivity image obtained with well measurement system 100 (e.g., Referring to FIG. 1) without any corrections discussed above. Thus, apparent resistivity as illustrated is the measured impedance of each button electrode 304 (e.g., Referring to FIG. 3) divided by a tool constant. True formation resistivity may be overlaid in dashed lines 1100, with the axis of the apparent resistivity shown at the top of the figure. Line 1102 illustrates the average apparent resistivity from all twenty four buttons electrodes in button array 128 (e.g., Referring to FIG. 1). Color map of the image is shown on the right of the image and proportional to the measured apparent resistivity. It may be observed that the apparent resistivity does not follow the true formation resistivity accurately, with a large amount of dielectric rolloff effect in high resistivity regions.

Figure 12:
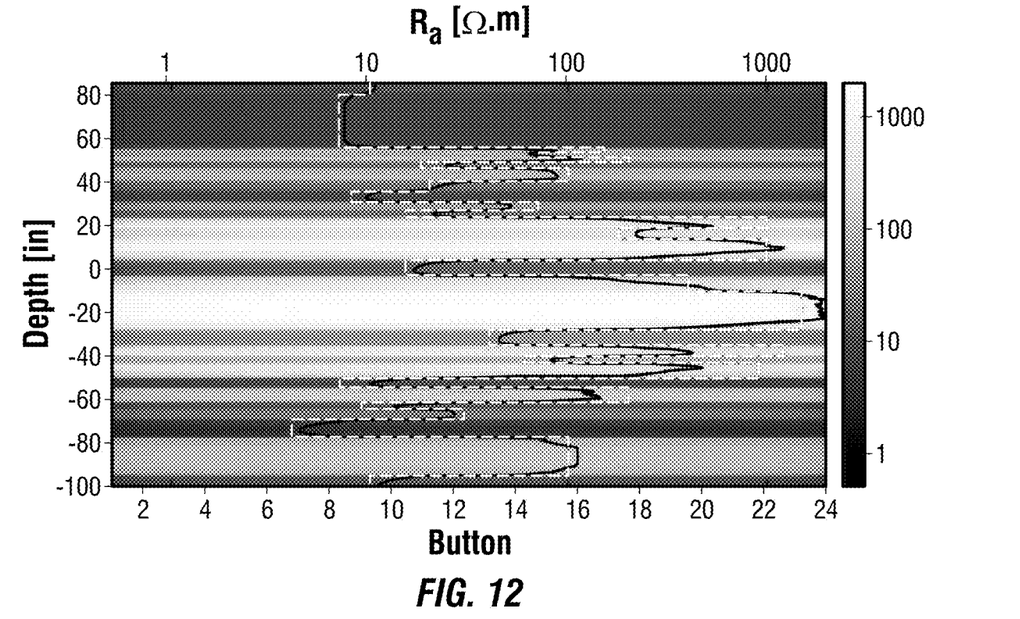
FIG. 12 illustrates an example of measured apparent resistivity with the dielectric correction.

In FIG. 12, an apparent resistivity image after the application of the improved dielectric correction is shown. For mud impedance estimate, analytical mud impedance formula with the correct mud resistivity and permittivity is used, however the standoff distance is 2.5 mm instead of the true value of 3 mm, which may introduce noise to the process. It may be seen that the apparent resistivity values follow the true resistivity values very well, especially in thicker layers. In thinner layers, shoulder bed effects that reduce the accuracy may be observed.

Figure 13:
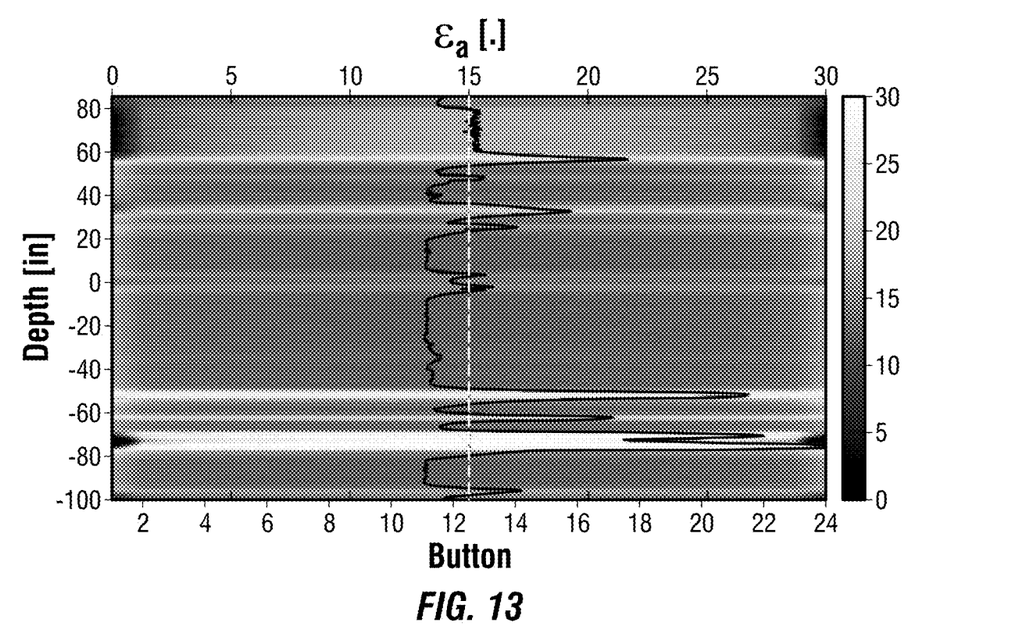
FIG. 13 illustrates an example of relative permittivity with the dielectric constant after the dielectric correction and the scaling with the tool constant.

Finally, in FIG. 13, relative permittivity image of formation 132 (e.g., Referring to FIG. 1) is shown. This image is highly sensitive to the errors in the mud impedance at low resistivity layers, but in general, if the resistivity of the formation is above ~40 Ω-m, a good estimate of the permittivity may be obtained. As mentioned before, this estimate may be improved if the mud impedance is estimated accurately or measurements are made at even higher frequencies.

As discussed above, it may be assumed that a simple constant coefficient (a tool constant) may be used to convert impedance to resistivity. However, the procedures discussed above may be altered by implementing a variable tool scaling function in place of a tool constant of well measurement system 100 (e.g., Referring to FIG. 1). This function may be determined based on modeling or experimental analysis and may be a function of the corrected impedance (for example from Equation 11) and estimated standoff and may scale the corrected impedance to obtain an apparent resistivity as shown in Equation 15, seen below. Such a function may improve the accuracy of the estimated apparent resistivity and as a result estimated permittivity of formation 132 (e.g., Referring to FIG. 1).

$$R_a = \frac{\text{Re}\{Z_{corr}\}}{F(Z_{corr}, so)} \quad (15)$$

It should be noted that the dielectric correction of Equation 11 and improved dielectric correction of Equation 14. Additionally, it may be possible to use the Equation 11 directly and estimate permittivity as:

$$\varepsilon_a \approx \frac{-\tan(\phi_z)}{\omega R_a} \quad (16)$$

which may result in a loss of accuracy. In other examples, processing technique described above may be used as an initial guess of an inversion algorithm. Although the accuracy of the results may be improved using an inversion, this procedure may be computationally costly and may generally not be performed in real time.

Accordingly, a system and method for correcting for a dielectric effect and obtaining an accurate resistivity estimate from a downhole device may be provided. The systems and methods disclosed herein may include any of the various features of the systems and methods disclosed herein, including one or more of the following statements.

Statement 1. A method of resistivity imaging may comprise disposing a downhole tool into a borehole, wherein the downhole tool comprises a pad and a plurality of electrodes disposed on the pad, taking an impedance measurement with the plurality of electrodes, applying a correction to the measured impedance by using a relaxation constant of the measured impedance to find a corrected impedance for each electrode of the plurality of electrodes, and constructing an image from the corrected impedance, wherein the image maps formation impedance.

Statement 2. The method of statement 1, wherein the corrected impedance is found from $Z_{corr}=Z_{BF}(1-j \tan(\phi_Z))$.

Statement 3. The method of statement 1 or statement 2, further comprising dividing a real part of the corrected impedance with a tool constant to estimate a formation resistivity estimate.

Statement 4. The method of any of the preceding statements, where the tool constant is a function of corrected impedance.

Statement 5. The method of any of the preceding statements, further comprising estimating a formation permittivity from the relaxation constant of the measured impedance and the formation resistivity estimate.

Statement 6. The method of any of the preceding statements, further comprising estimating formation permittivity from $$\varepsilon_a \approx \frac{-\tan(\phi_z)}{\omega R_a}.$$

Statement 7. The method of any of the preceding statements, further comprising measuring a property of a mud capable of being disposed borehole; estimating a distance for a standoff, wherein the standoff is the distance between one of the plurality of electrodes and an inner wall of the borehole, for each electrode of the plurality of electrodes; estimating a mud impedance with the distance for the standoff and the property of the mud; subtracting the mud impedance from the measured impedance to find a mud effect removed impedance ($\tilde{Z}_F$) for each electrode of the plurality of electrodes; and applying a correction to the mud effect removed impedance by using its relaxation constant to find the corrected impedance.

Statement 8. The method of any of the preceding statements, wherein the corrected impedance is found from $$Z_{corr} = \tilde{Z}_F \times \left(1 - j \tan\left(\phi_{\tilde{Z}_F}\right)\right).$$

Statement 9. The method of any of the preceding statements, further comprising dividing a real part of the corrected impedance with a tool constant to estimate a formation resistivity estimate.

Statement 10. The method of any of the preceding statements, wherein the tool constant is a function of the corrected impedance.

Statement 11. The method of any of the preceding statements, where the tool constant is a function of the distance for the standoff.

Statement 12. The method of any of the preceding statements, further comprising estimating a formation permittivity from the relaxation constant of the mud effect removed impedance and formation resistivity estimate.

Statement 13. The method of any of the preceding statements, wherein the formation permittivity is found from $$\varepsilon_a \approx \frac{-\tan\left(\phi_{\tilde{Z}_F}\right)}{\omega R_a}.$$

Statement 14. A system for resistivity imaging may comprise a downhole tool, wherein the downhole tool comprises: an arm; and a pad, wherein the pad comprises a plurality of electrodes and at least one return electrode; a conveyance for disposing the downhole tool in a borehole; and an information handling system, wherein the information handling system is configured to record a measurement of impedance for each electrode of the plurality of electrodes, correct the impedance using a relaxation constant of the measured impedance to find a relaxation constant of the measured impedance and construct an image from the corrected impedance, wherein the image maps formation impedance.

Statement 15. The system of statement 14, wherein the information handling system is further configured to divide a real part of the corrected impedance with a tool constant to estimate a formation resistivity estimate.

Statement 16. The system of statement 14 or statement 15, wherein the tool constant is a function of the corrected impedance.

Statement 17. The system of statement 14 to statement 16, wherein the information handling system is further configured to estimate a formation permittivity from the measured impedance and the estimated formation resistivity.

Statement 18. The system of statement 14 to statement 17, wherein the formation permittivity is found from $$\varepsilon_a \approx \frac{-\tan(\phi_z)}{\omega R_a}.$$

Statement 19. The system of statement 14 to statement 18, wherein the corrected impedance is found from. $Z_{corr}=Z_{BF}(1-j\tan(\phi_Z))$.

Statement 20. The system of statement 14 to statement 19, where the information handling system is further configured to record a measurement of a property of a mud within the borehole, estimate a distance for standoff of each electrode of the plurality of electrodes, estimate a mud impedance based on the property of the mud and the standoff, subtract the mud impedance from the measured impedance to find a mud effect removed impedance for each electrode of the plurality of electrodes and replace the measured impedance in calculation of the corrected impedance and a formation permittivity.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of resistivity imaging, comprising:
    disposing a downhole tool into a borehole, wherein the downhole tool comprises a pad and a plurality of electrodes disposed on the pad;
    taking a plurality of impedance measurements with the plurality of electrodes;
    applying a dielectric effect correction to the impedance measurements by using a relaxation constant of the impedance measurements to find a corrected impedance for each electrode of the plurality of electrodes; and
    constructing an image from the corrected impedance, wherein the image maps formation impedance.

2. The method of claim 1, wherein the corrected impedance is found from:

$$Z_{corr} = \tilde{Z}_F \times \left(1 - j\tan\left(\phi_{\tilde{Z}_F}\right)\right)$$

wherein $\phi_z$ is a phase angle of the impedance measurements.

3. The method of claim 1, further comprising dividing a real part of the corrected impedance with a tool constant to estimate a formation resistivity estimate.

4. The method of claim 3, where the tool constant is a function of corrected impedance.

5. The method of claim 3, further comprising estimating a formation permittivity from the relaxation constant of the impedance measurements and the formation resistivity estimate.

6. The method of claim 5, further comprising estimating formation permittivity from:

$$\varepsilon_a \approx \frac{-\tan(\phi_z)}{\omega R_a}$$

wherein $\phi_z$ is a phase angle of the impedance measurements and $R_a$ is an apparent resistivity.

7. The method of claim 1 further comprising;
    measuring a property of a mud disposed in a borehole;

estimating a distance for a standoff, wherein the standoff is the distance between one of the plurality of electrodes and an inner wall of the borehole, for each electrode of the plurality of electrodes;
estimating a mud impedance with the distance for the standoff and the property of the mud;
subtracting the mud impedance from the impedance measurements to find a mud effect removed impedance ($\tilde{Z}_F$) for each electrode of the plurality of electrodes; and
applying a correction to the mud effect removed impedance by using its relaxation constant to find the corrected impedance.

8. The method of claim 7, wherein the corrected impedance is found from:

$$Z_{corr} = \tilde{Z}_F \times (1 - j\tan(\phi_{\tilde{Z}_F}))$$

wherein $\phi\tilde{Z}F$ is a phase angle of the mud effect removed impedance.

9. The method of claim 7, further comprising dividing a real part of the corrected impedance with a tool constant to estimate a formation resistivity estimate.

10. The method of claim 9, wherein the tool constant is a function of the corrected impedance.

11. The method of claim 9 where the tool constant is a function of the distance for the standoff.

12. The method of claim 9, further comprising estimating a formation permittivity from the relaxation constant of the mud effect removed impedance and formation resistivity estimate.

13. The method of claim 12, wherein the formation permittivity is found from:

$$\varepsilon_a \approx \frac{-\tan(\phi_{\tilde{Z}_F})}{\omega R_a}$$

wherein $R_a$ is an apparent resistivity and $\phi\tilde{Z}F$ is a phase angle of the mud effect removed impedance.

14. A system for resistivity imaging, comprising:
a downhole tool, wherein the downhole tool comprises:
an arm; and
a pad, wherein the pad comprises a plurality of electrodes and at least one return electrode that are configured to take a plurality of impedance measurements;
a conveyance for disposing the downhole tool in a borehole; and
an information handling system, wherein the information handling system is configured to apply a dielectric effect correction to the impedance measurements by using a relaxation constant of the impedance measurements to find a corrected impedance of the impedance measurements, and construct an image from the corrected impedance, wherein the image maps formation impedance.

15. The system for improving resistivity imaging of claim 14, wherein the information handling system is further configured to divide a real part of the corrected impedance with a tool constant to estimate a formation resistivity estimate.

16. The system for improving resistivity imaging of claim 15, wherein the tool constant is a function of the corrected impedance.

17. The system for improving resistivity imaging of claim 15, wherein the information handling system is further configured to estimate a formation permittivity from the impedance measurements and the estimated formation resistivity.

18. The system for improving resistivity imaging of claim 17, wherein the formation permittivity is found from:

$$\varepsilon_a \approx \frac{-\tan(\phi_z)}{\omega R_a}$$

wherein $\phi_z$ is a phase angle of the impedance measurements and $R_a$ is an apparent resistivity.

19. The system for improving resistivity imaging of claim 14, wherein the corrected impedance is found from:

$$Z_{corr} = Z_{BF}(1 - j\tan(\phi_Z))$$

wherein $\phi_z$ is a phase angle of the impedance measurements.

20. The system for improving resistivity imaging of claim 14, where the information handling system is further configured to record a measurement of a property of a mud within the borehole, estimate a distance for standoff of each electrode of the plurality of electrodes, estimate a mud impedance based on the property of the mud and the standoff, subtract the mud impedance from the measured impedance to find a mud effect removed impedance for each electrode of the plurality of electrodes and replace the measured impedance in calculation of the corrected impedance and a formation permittivity.

* * * * *